(12) United States Patent
Wang

(10) Patent No.: US 7,878,685 B2
(45) Date of Patent: *Feb. 1, 2011

(54) FORMED LIGHTING FIXTURES

(76) Inventor: Jessica Wang, 16F-3, No. 70, Sec. 2, Tun-Hua South Road, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/770,540

(22) Filed: Apr. 29, 2010

(65) Prior Publication Data

US 2010/0277909 A1 Nov. 4, 2010

Related U.S. Application Data

(63) Continuation of application No. 11/460,793, filed on Jul. 28, 2006, now Pat. No. 7,753,557, which is a continuation of application No. 10/953,899, filed on Sep. 29, 2004, now Pat. No. 7,086,757, which is a continuation of application No. 10/771,841, filed on Feb. 4, 2004, now Pat. No. 6,830,361, which is a continuation of application No. 10/350,024, filed on Jan. 24, 2003, now Pat. No. 6,719,440.

(51) Int. Cl.
*F21V 21/00* (2006.01)

(52) U.S. Cl. .................. 362/249.16; 362/249.01; 362/249.06; 362/249.14

(58) Field of Classification Search .......... 362/121, 362/124, 227, 244, 249, 252, 806, 807, 808, 362/812; 211/1.51, 181.1
See application file for complete search history.

(56) References Cited

U.S. PATENT DOCUMENTS

| | | |
|---|---|---|
| 1,134,834 A | 4/1915 | Fisher |
| 1,589,018 A | 6/1926 | Ludwig |
| 1,684,922 A | 9/1928 | Mammen |
| 1,902,991 A | 3/1933 | Cardon |
| 2,173,032 A | 9/1939 | Wintermute |
| 2,174,328 A | 9/1939 | Meston et al. |
| 2,191,041 A | 2/1940 | Protz |
| 3,400,263 A | 9/1968 | Yakim |
| 3,694,648 A | 9/1972 | Yates |

(Continued)

FOREIGN PATENT DOCUMENTS

CN 2475920 2/2002

(Continued)

OTHER PUBLICATIONS

Longwood Gardens—Seasonal Festivals—2000 Christmas, URL=http://www.longwoodgardens.org/SeasonalFestivals/Christmas/2000christmas.htm, download date Nov. 23, 2000.

(Continued)

*Primary Examiner*—Hargobind S Sawhney
(74) *Attorney, Agent, or Firm*—Seed IP Law Group PLLC

(57) ABSTRACT

An improved formed lighting fixture having a frame, a plurality of bulbs, and a refracting layer, in which the frame is formed by gathering a plurality of rods and profiled in a specific contour, the bulbs are installed on the frame to serve as lighting ornaments, and the rod frame is coated with a refracting layer of a transparent material. A formed lighting fixture so constructed can offer a dazzling effect to thereby reduce bulb amount and facilitate production.

11 Claims, 5 Drawing Sheets

U.S. PATENT DOCUMENTS

| | | | |
|---|---|---|---|
| 4,060,722 | A | 11/1977 | Foley |
| 4,219,870 | A | 8/1980 | Haraden et al. |
| 4,228,486 | A | 10/1980 | Matsuya |
| 4,339,787 | A | 7/1982 | Burnbaum |
| 4,364,102 | A | 12/1982 | Huppert et al. |
| 4,462,065 | A | 7/1984 | Rhodes |
| 4,713,586 | A | 12/1987 | Chiang |
| 4,757,099 | A | 7/1988 | Hoshino et al. |
| 4,803,396 | A | 2/1989 | Kelner |
| 4,879,969 | A | 11/1989 | Haranoya et al. |
| 4,885,664 | A * | 12/1989 | Hermanson ............. 362/123 |
| 4,905,627 | A | 3/1990 | Yoshikawa |
| 4,992,914 | A | 2/1991 | Heiss et al. |
| 5,001,615 | A | 3/1991 | Stefanelli |
| 5,104,608 | A | 4/1992 | Pickering |
| 5,108,777 | A | 4/1992 | Laird |
| 5,150,964 | A | 9/1992 | Tsui |
| 5,233,680 | A | 8/1993 | Fussell |
| 5,250,331 | A | 10/1993 | Grefalda |
| 5,331,529 | A | 7/1994 | Huang |
| 5,367,443 | A | 11/1994 | Hara |
| 5,379,202 | A | 1/1995 | Daun |
| 5,394,315 | A | 2/1995 | Ahroni |
| 5,396,408 | A | 3/1995 | Szczech, III |
| 5,498,922 | A | 3/1996 | Chang |
| 5,517,390 | A | 5/1996 | Zins |
| 5,566,483 | A | 10/1996 | Ogren |
| 5,580,159 | A | 12/1996 | Liu |
| 5,626,415 | A | 5/1997 | Huang |
| 5,645,343 | A | 7/1997 | Rinehimer |
| 5,772,312 | A | 6/1998 | Pihl-Niederman et al. |
| 5,816,686 | A | 10/1998 | Wang et al. |
| 5,828,183 | A | 10/1998 | Wang et al. |
| 5,850,927 | A | 12/1998 | Pan |
| 5,861,128 | A | 1/1999 | Vick et al. |
| 5,915,827 | A | 6/1999 | Wang |
| 5,955,156 | A | 9/1999 | Hermanson |
| 5,969,469 | A | 10/1999 | Wang |
| 6,001,435 | A | 12/1999 | Hardy et al. |
| 6,164,793 | A | 12/2000 | Wu |
| 6,180,193 | B1 | 1/2001 | Bostedt |
| 6,258,871 | B1 | 7/2001 | Brown, III |
| 6,284,330 | B1 | 9/2001 | Hermanson |
| 6,329,028 | B1 | 12/2001 | Bucher |
| 6,334,974 | B1 | 1/2002 | Chen |
| 6,352,355 | B1 * | 3/2002 | Law ............................. 362/253 |
| 6,394,282 | B1 | 5/2002 | Pan |
| 6,413,594 | B1 | 7/2002 | Onishi |
| 6,478,164 | B1 | 11/2002 | Pan |
| 6,561,674 | B2 * | 5/2003 | Gibboney, Jr. .............. 362/253 |
| 6,566,416 | B2 | 5/2003 | Brown, III |
| 6,652,927 | B1 | 11/2003 | Chen |
| 6,682,208 | B1 | 1/2004 | Pan |
| 6,719,440 | B1 | 4/2004 | Wang |
| 6,769,954 | B2 | 8/2004 | Su |
| 6,830,361 | B2 | 12/2004 | Wang |
| 6,854,863 | B2 | 2/2005 | Wu |
| 6,905,229 | B2 | 6/2005 | Fan |
| 7,086,757 | B2 | 8/2006 | Wang |
| 7,303,312 | B2 | 12/2007 | Wang |
| 7,581,851 | B2 | 9/2009 | Wang |
| 7,585,091 | B2 | 9/2009 | Wang |
| 2002/0121295 | A1 | 9/2002 | Chen et al. |
| 2003/0156405 | A1 | 8/2003 | Kim |
| 2003/0184829 | A1 | 10/2003 | Odhner et al. |
| 2003/0214809 | A1 | 11/2003 | Wong |
| 2004/0100797 | A1 | 5/2004 | Yang |
| 2004/0125594 | A1 | 7/2004 | Wu |
| 2005/0105288 | A1 | 5/2005 | Chen |
| 2006/0147353 | A1 | 7/2006 | Wang |
| 2006/0158888 | A1 | 7/2006 | Wang |
| 2006/0274526 | A1 | 12/2006 | Weston et al. |

FOREIGN PATENT DOCUMENTS

CN             02272047.2          10/2003

OTHER PUBLICATIONS

ChristmasDepot.com—Outdoor Decorations Topiary Sculptures Menu, URL=http://web.archive.org/web/20020117044252/www.christmaspromotions.com/menu.cgi?S=Outdo..., archived as of Jan. 17, 2002.

ChristmasDepot.com—Christmas—Outdoor Decorations—Topiary Sculptures—Standing Deer—3..., URL=http://web.archive.org/web/20020118074543/www.christmaspromotions.com/prod.cgi?6904, archived as of Jan. 18, 2002.

ChristmasLights, Etc.-christmas lights, pre-lit artificial christmas trees, outdoor decorations, URL=http://web.archive.org/web/20020121032518/http://www.christmaslightsetc.com/, archived as of Jan. 21, 2002.

Christmas Holiday Decorations by Brite Star, URL=http://web.archive.org/web/20010708003923/www.britestar.com/products.ASP?PID=1620&SID=..., archived as of Jul. 8, 2001.

Photographs taken on Nov. 16, 2005, Magicolor 100 Light String Set, Magicolor, Inc., Arlington, Texas, first sold Apr. 13, 2001.

* cited by examiner exgit # FORMED LIGHTING FIXTURES

CROSS-REFERENCES TO RELATED APPLICATIONS

This application is a continuation of U.S. patent application Ser. No. 11/460,793, filed Jul. 28, 2006, now pending, which is a continuation of U.S. patent application Ser. No. 10/953,899, filed Sep. 29, 2004, issued as U.S. Pat. No. 7,086,757, granted Aug. 8, 2006, which is a continuation of Ser. No. 10/771,841, filed Feb. 4, 2004, issued as U.S. Pat. No. 6,830,361, granted Dec. 14, 2004, which is a continuation of U.S. patent application Ser. No. 10/350,024, filed Jan. 24, 2003, issued as U.S. Pat. No. 6,719,440, granted Apr. 13, 2004, which applications are incorporated herein by reference in their entirety.

FIELD OF THE INVENTION

This invention relates generally to formed lighting fixtures, and more particularly, it relates to an improved formed lighting fixture, which creates a dazzling effect through a refracting layer so the lighting fixtures can be made easily and the number of bulbs used can be reduced.

BACKGROUND OF THE INVENTION

In order to heighten a festive atmosphere, formed lighting fixtures made in specific shapes can be displayed. Referring to FIG. 1, a conventional formed lighting fixture is constructed with a frame (A) and a plurality of light tubes (B), in which the frame (A) can have a specific appearance and be comprised of a plurality of rods, while the light tubes (B) are tangled on and along the entire skeleton such that the frame (A) could serve as a lighting ornament.

In a conventional formed lighting fixture, the bulb in the light tube (B) is operated to emanate light; however, the light either is not refracted or is refracted poorly through the tube wall. Therefore, an object of this invention is to enhance the dazzling phenomenon with fewer bulbs to thereby save power and energy compared with the conventional fixture.

SUMMARY OF THE INVENTION

The primary objective of this invention is to provide an improved structure of formed lighting fixtures for eliminating the defects as mentioned in the conventional fixture.

In order to realize this objective, the structure of formed lighting fixtures of this invention is constructed with a frame, a plurality of bulbs, and a refracting layer, in which the frame can be formed by gathering a plurality of rods and profiled in a specific contour (e.g., a Christmas tree, a Santa Claus, or an elk, etc.). The bulbs can then be installed on the frame to serve as lighting ornaments. The frame is then coated with a layer of transparent refracting material (such as plastic, acrylic, PVC, or glass or another vitreous material).

The advantages and features of this invention could be summarized as the following:

1. By coating a refracting layer on the frame, the light from the bulbs can be refracted to produce a dazzling effect;

2. Reduced cost and energy savings can be appreciated by reducing the number of bulbs; and 3. As the refracting layer can be formed by fusing the coating material onto the frame, the job can be done easily and rapidly independent of the formation of the frame.

For more detailed information regarding advantages or features of this invention, at least an example of a preferred embodiment will be fully described below with reference to the enclosed drawings.

BRIEF DESCRIPTION OF THE DRAWINGS

The drawings discussed in the detailed description of this invention are described briefly as follows, in which.

DETAILED DESCRIPTION OF THE INVENTION

The detailed description of some preferred embodiments is made below with reference to the enclosed drawings.

Figure 1:
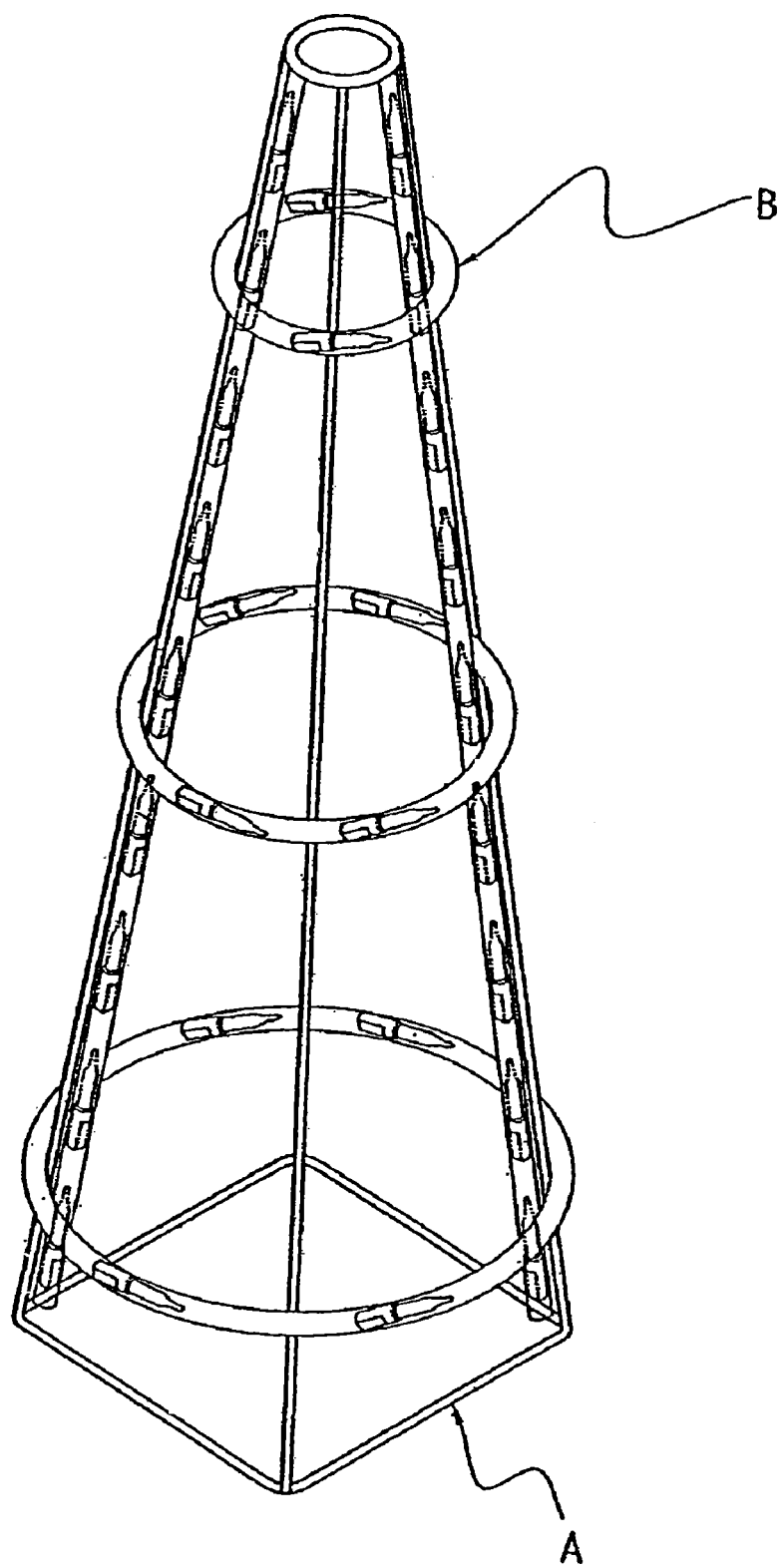
FIG. 1 is a perspective view of a conventional formed lighting fixture, according to the prior art.
Figure 2:
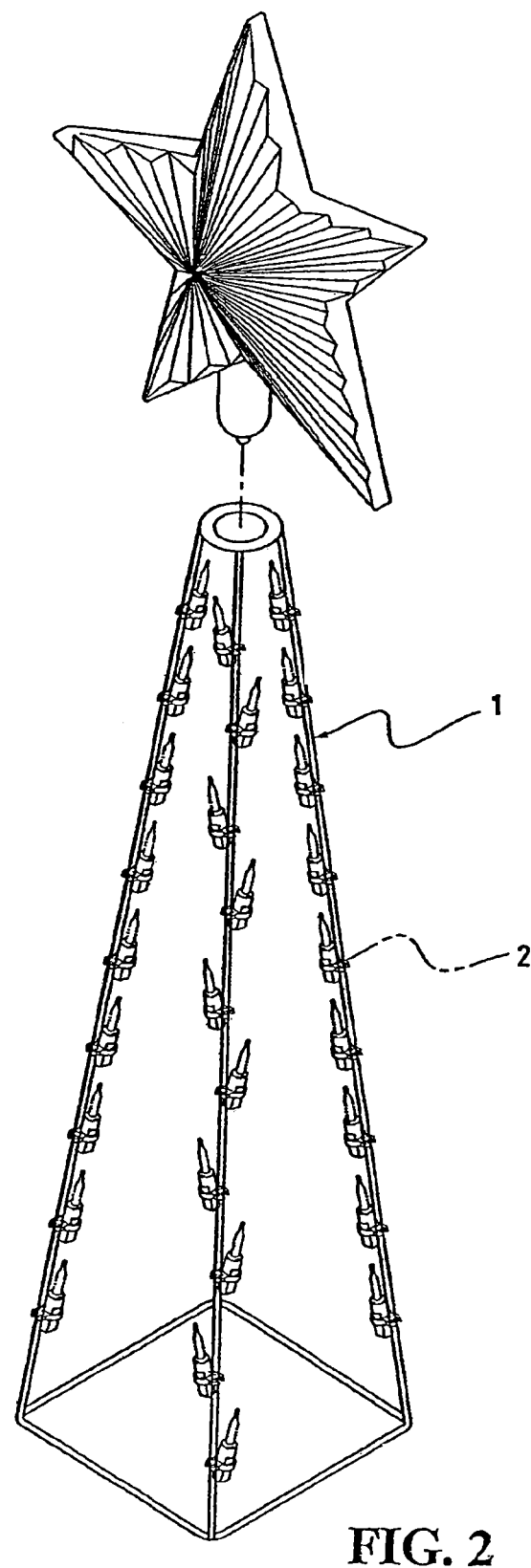
FIG. 2 is a perspective view of a lighting fixture of this invention, without the refractive coating layer.
Figure 3:
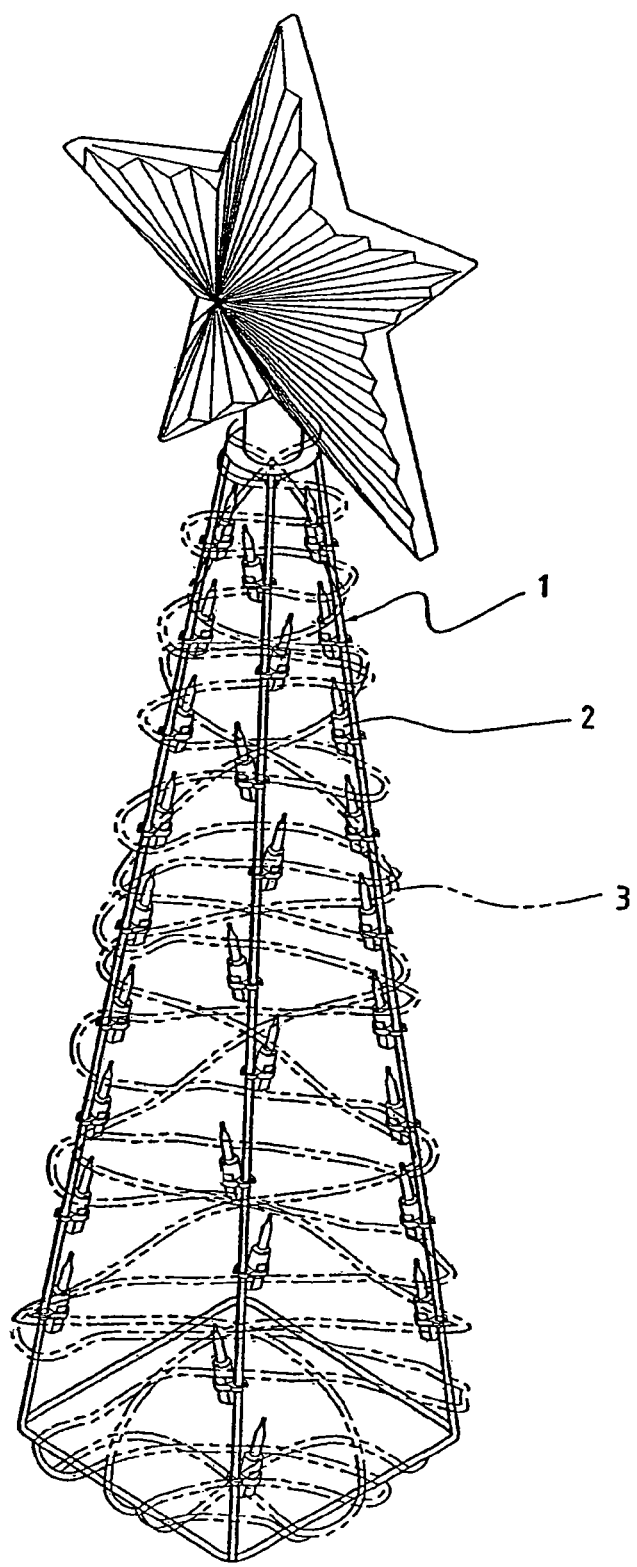
FIG. 3 is a perspective view of the lighting fixture of this invention, coated with a refracting layer.

Referring to FIGS. 2 and 3, according to a preferred embodiment of this invention, the formed lighting fixture is comprised of a frame (1), a plurality of bulbs (2), and a refracting layer (3).

The frame (1) illustrated in FIGS. 2 and 3 is substantially a quadrangular tapered skeleton made by aggregating a plurality of rods. The plurality of bulbs (2) are disposed scatteringly on the ribs of the frame (1) and serve as the fixture's light source, and the refracting layer (3) is made of a transparent material and is coated on the rod frame (1).

The refracting layer (3) can be either a transparent vitreous material or a plastic material, such as PVC or acrylic.

Moreover, the illustrated refracting layer (3) made of a transparent material is specifically tinted and patterned.

Figure 4:
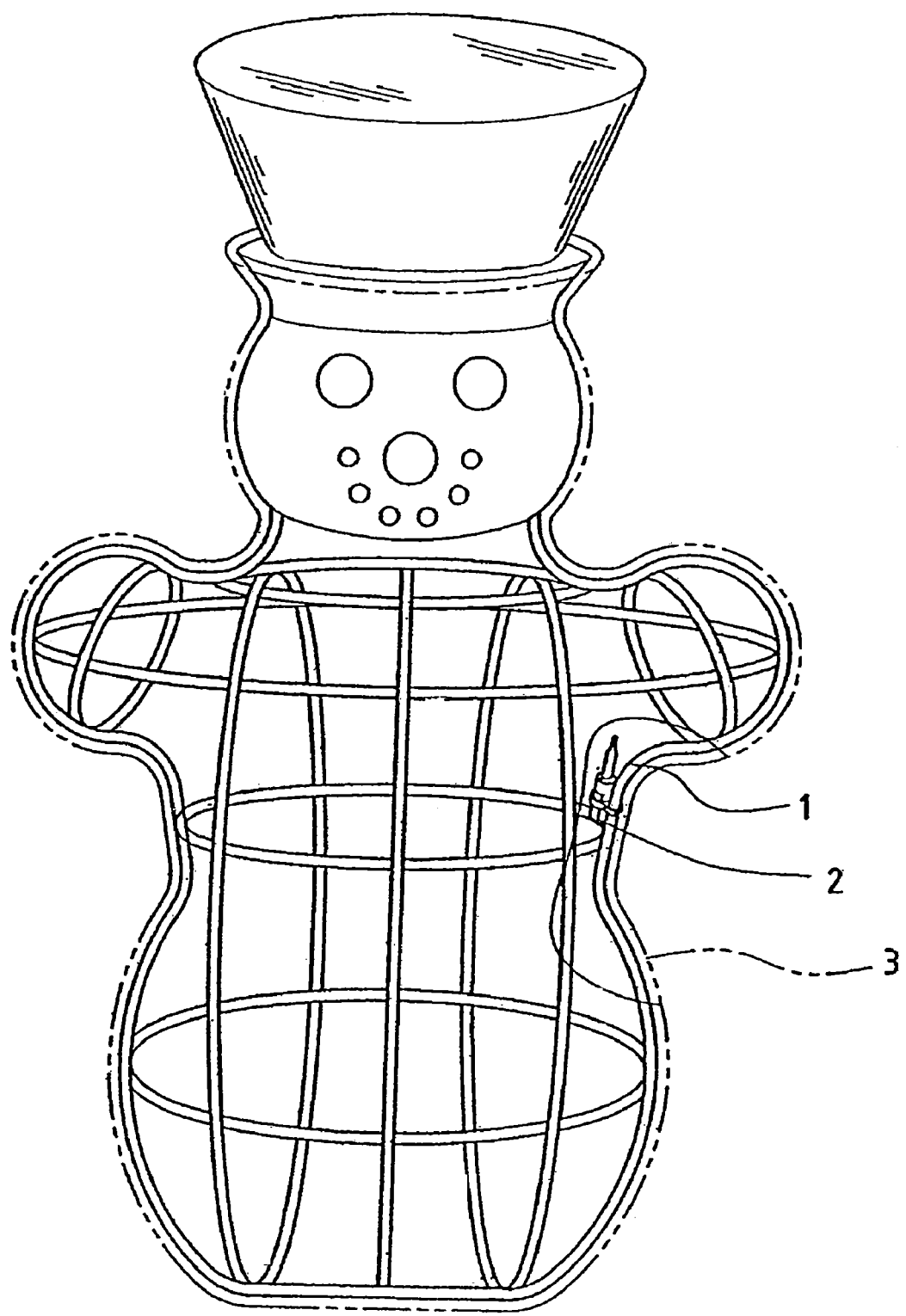
FIG. 4 is a perspective view of a lighting fixture according to another embodiment of this invention.
Figure 5:
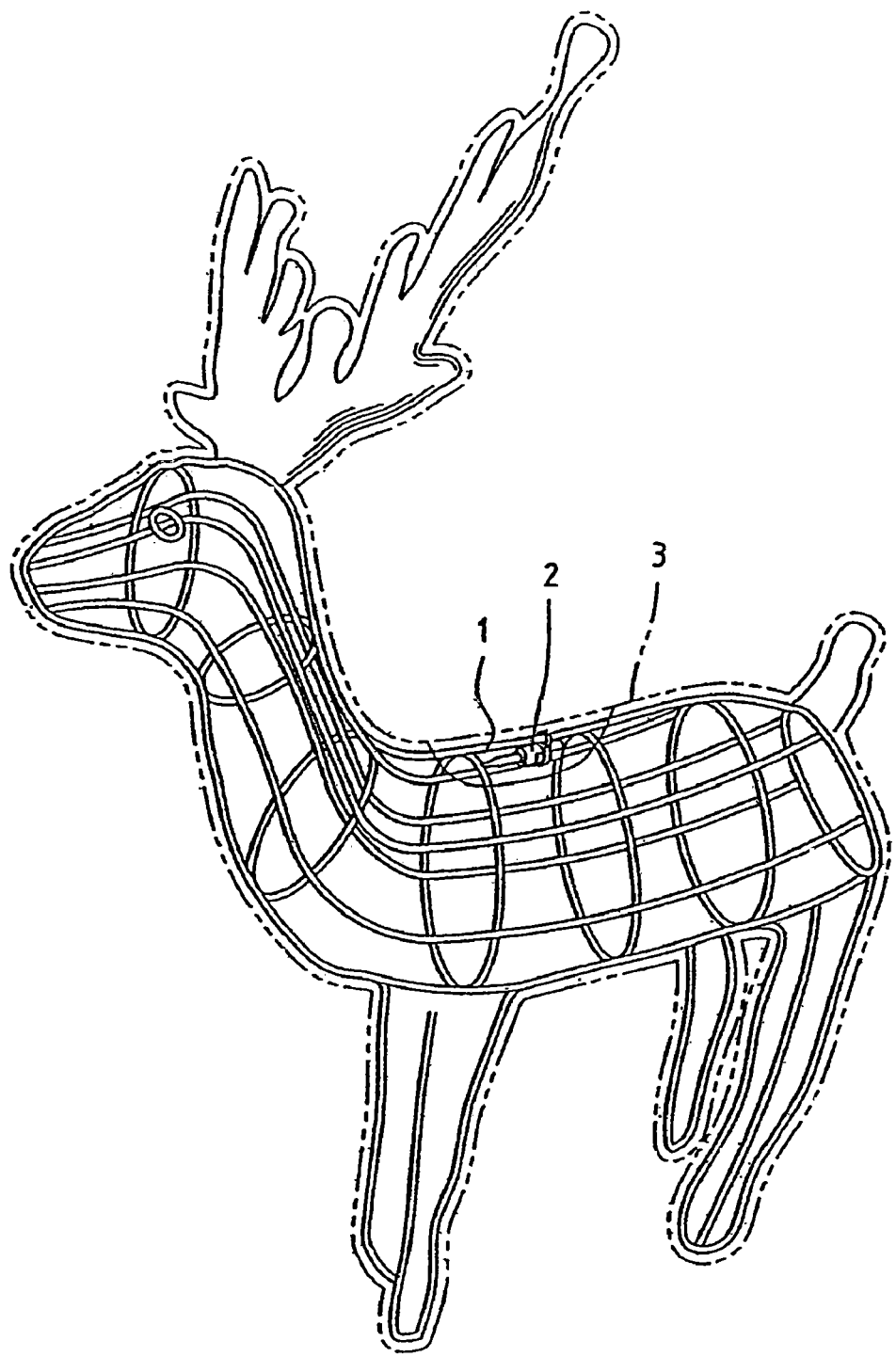
FIG. 5 is a perspective view of a lighting fixture according to yet another embodiment of this invention.

According to another embodiment of the formed lighting fixtures of this invention, shown in FIGS. 4 and 5, the frame (1) is profiled in a snowman or an elk by combining a plurality of molded rods provided with a plurality of bulbs (2) and coated with a refracting layer (3). In FIGS. 3 and 4, the refracting layer is represented by centerlines for clarity. Thus, it would be understood by one of ordinary skill in the art, having reviewed this entire disclosure, that the portions of the structures shown in centerline would be covered by a refractive layer similar to that illustrated and described in connection with the embodiment shown in FIG. 2.

The frame (1) of the formed lighting fixtures of this invention is skeletonized and formed into a seasonable and timely formation, such as a Christmas tree, a snowman, or an elk, etc., with selected proper rod or rib material. Then, the bulbs (2) are disposed on the skeleton of the frame (1), and finally, a suitable vitreous or transparent material, such as glass, PVC, or acrylic for example, is fused and distributed scatteringly and randomly on the skeleton of the frame (1) in its thready state to thereby form the refracting layer (3). As a result, a dazzling phenomenon, making the formed lighting fixtures more splendid and elegant, is created when light emitted from the bulbs (2) penetrates into and refracted through the refracting layer (3).

In addition, where the transparent refracting layer (3) is specifically tinted, the formed lighting fixtures would create a more colorful and attractive scene. Further, a specific pattern of colors, for example an ornament on a Christmas tree, a Santa Claus costume, or the stripe or bell of an elk, could be added to the refracting layer (3) to enrich the variations of the formed lighting fixtures.

In the above description, at least one preferred embodiment has been described in detail with reference to the enclosed drawings, and it is apparent that numerous changes or modifications may be made without departing from the true spirit and scope thereof, as set forth in the claims below.

The invention claimed is:

1. A lighted display comprising:
    a frame comprising a plurality of curved rods attached together to create a skeletonized and contoured shape,
    a light source comprising a plurality of lighting elements spaced about the frame and at least a portion of the light source coupled directly to the plurality of curved rods, and
    a light refracting pattern comprising a plurality of elongated light transmissive threads wrapped around at least a portion of the frame and attached directly to at least some of the plurality of curved rods.

2. The lighted display of claim 1 wherein the frame is in a three-dimensional shape.

3. The lighted display of claim 1 wherein at least some of the elongated light transmissive threads are coupled together.

4. The lighted display of claim 1 wherein at least some of the light refracting pattern is tinted differently at different locations of the frame to create a colored pattern.

5. The lighted display of claim 1 wherein at least some of the light refracting pattern has a scattered form.

6. The lighted display of claim 1 wherein at least some of the light refractive pattern is a single continuous thread.

7. A lighted display comprising:
    a frame comprising a plurality of curved rods attached together to create a skeletonized and contoured shape,
    a plurality of lighting elements spaced about the frame and coupled to the plurality of curved rods, and
    at least one light refracting thread wrapped around at least a portion of the frame.

8. The lighted display of claim 7 wherein the at least one light refracting thread comprises several elongated refractive lengths.

9. The lighted display of claim 8, wherein the at least some of the several elongated refractive lengths are coupled to other material.

10. The lighted display of claim 8 wherein the several elongated refractive lengths are coupled together and spaced about at least some of the plurality of curved rods.

11. The lighted display of claim 8 wherein the several elongated refractive lengths are coupled together to form a pattern.

* * * * *